Figures 5, 6, 7:
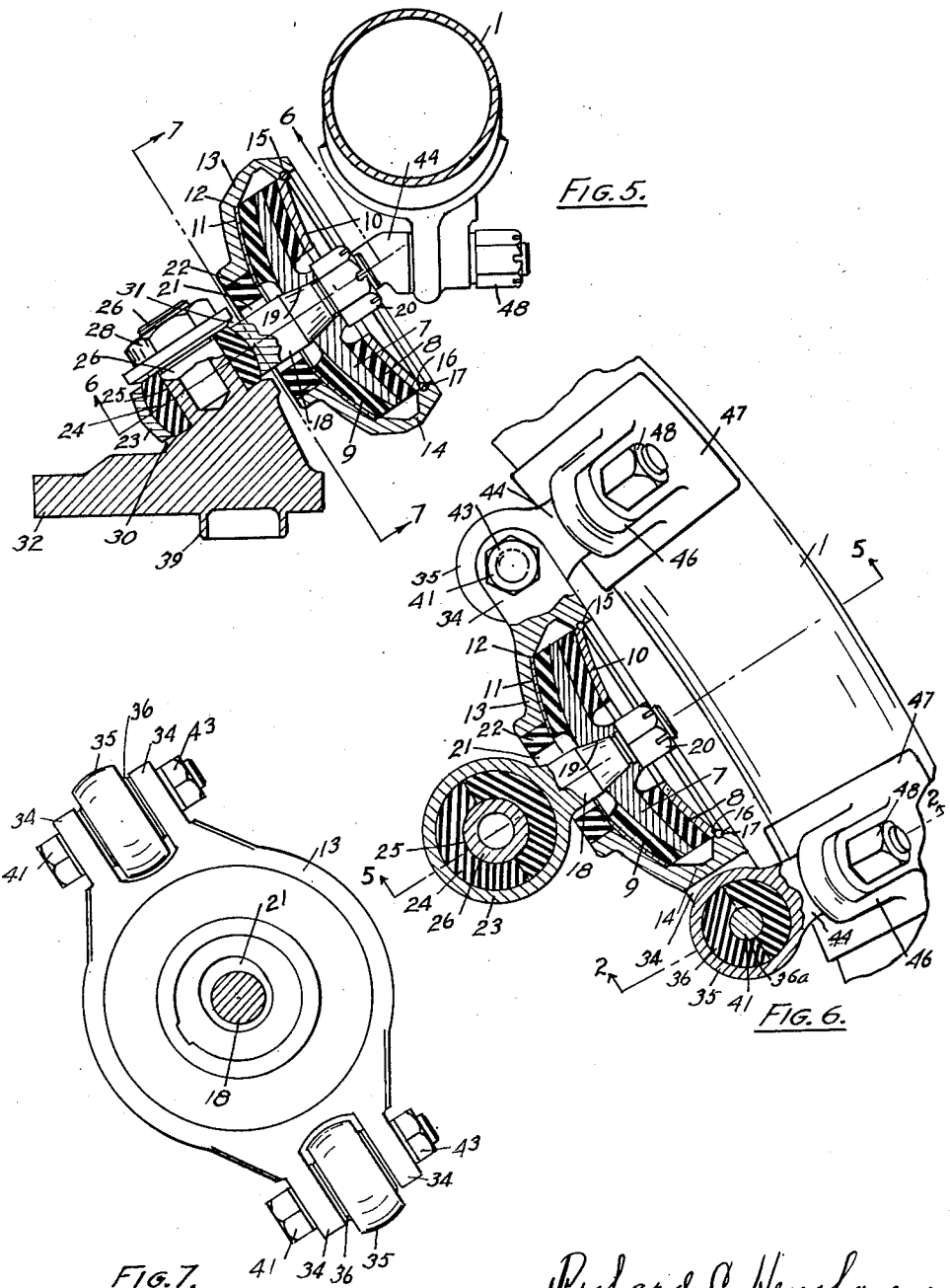

Sept. 25, 1945.    R. C. HENSHAW    2,385,759
RESILIENT MOUNTING
Filed Feb. 17, 1941    2 Sheets-Sheet 1
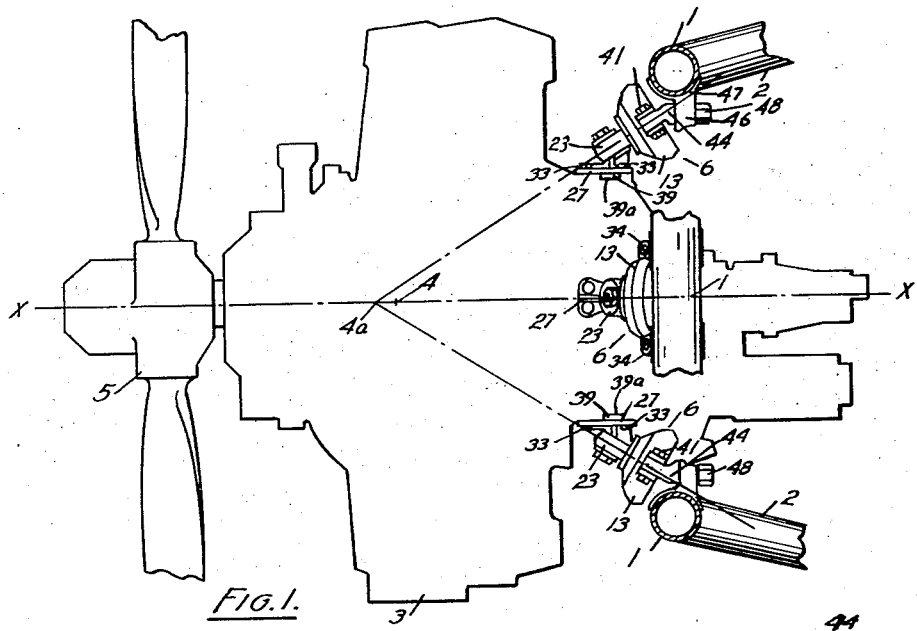
FIG. 1.
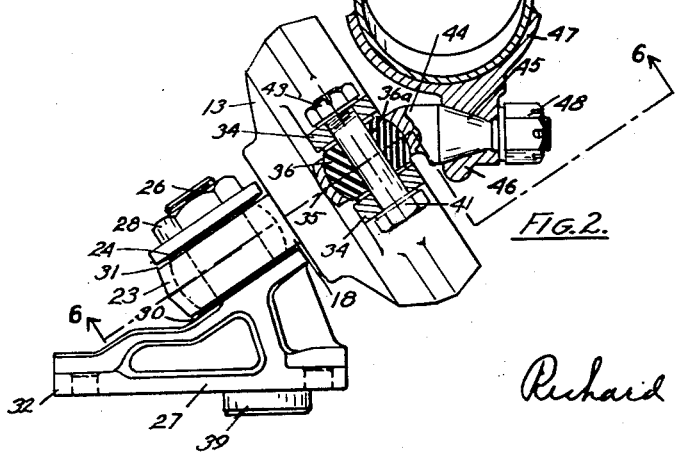
FIG. 3.
FIG. 4.
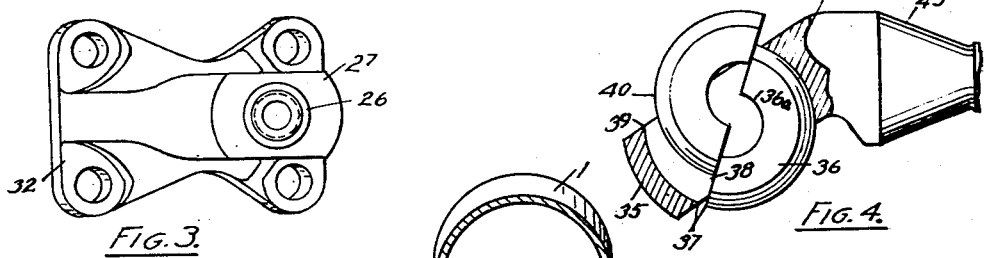
FIG. 2.
Richard C. Henshaw
INVENTOR
BY
ATTORNEYS Sept. 25, 1945.  R. C. HENSHAW  2,385,759
RESILIENT MOUNTING
Filed Feb. 17, 1941  2 Sheets-Sheet 2

Richard C. Henshaw
INVENTOR

BY T.Y.C. Lord
ATTORNEYS

Patented Sept. 25, 1945

2,385,759

UNITED STATES PATENT OFFICE 2,385,759

RESILIENT MOUNTING

Richard C. Henshaw, Erie, Pa., assignor to Lord Manufacturing Company, Erie, Pa., a corporation of Pennsylvania Application February 17, 1941, Serial No. 379,260

28 Claims. (Cl. 248—5)

The present invention is intended to support vibrating bodies. As exemplified, the invention is arranged to support a vibrating body having torque induced vibrations and as shown, it forms the mounting for an overhung airplane engine carrying the propeller and is thereby subjected to varying disturbing factors involved in this structure.

In Patent 2,241,409 issued on an application of Hugh C. Lord filed March 6, 1940, Ser. No. 322,470, there is disclosed a construction having converging links with spherical rubber insulated joint elements swinging to accommodate torque, pitch and yaw movements, and in one exemplification a sliding spherical joint at one end of the link and a rubber yielding spherical surface joint at the opposite end. In that construction the torque resistance and pitch and yaw resistance may be varied by the location of the mountings with relation to the focal point for pitch and yaw and the axis of rotation of the engine, but the resistances are usually quite closely related. In Patent 2,270,673 issued on a second application by Hugh C. Lord, Ser. No. 354,595, the rubber accommodated spherical joints are supplemented by metallic joints swinging on fixed axes, the result of which is to eliminate the resistance of the rubber resisting joints in certain directions while maintaining this resistance in others so that a variation may be accomplished as desired between the pitch and yaw resistance and that of the torque resistance.

In the present invention the structure is such as to provide a spherical joint permitting the swinging at one end of the link and having the yielding resistance through the interposition of the rubber while the opposite end of the link is free to move in a sliding spherical joint.

The present invention is also designed to simplify a mechanism of this type, making possible a very short coupling of the mountings and is also designed to efficiently restrict the free movement, particularly the pitch and yaw movement, and to accomplish this restriction while avoiding a metallic contact through the links. Features and details of the invention will appear from the specification and claims.

A preferred embodiment of the invention is illustrated in the accompanying drawings as follows:

Fig. 1 shows an elevation of a mounting for the engine in outline.

Fig. 2 a side elevation of a mounting unit, partly in section, on the line 2—2 in Fig. 6.

Fig. 3 a plan view of the pedestal in which the pedestal is secured to the engine and to which the link is attached.

Fig. 4 an elevation, partly in section, showing the manner of assembling the spherical sliding joint.

Fig. 5 a section on the line 5—5 in Fig. 6.

Fig. 6 a sectional view of a mounting unit on the line 6—6 in Fig. 2.

Fig. 7 a section on the line 7—7 in Fig. 5.

1 marks the mounting ring, 2 struts leading to the ring, 3 a radial engine in outline having a center of gravity at 4, 5 a propeller carried by and driven by the engine, 6 mountings between the ring and engine, these mountings being of link form extending toward a focal point 4a about which the mountings permit freedom of movement in yielding to pitch and yaw vibrations and which also yield about the axis $x$—$x$ in response to torque impulses.

The mounting units have the spherical rubber resisting joints provided with a core 7 in the form of a plate having spherical outline. Rubber elements or elements of similar material 8 and 9 are bonded to the opposing surfaces of the core plate. The element 8 is bonded to a plate 10 and the element 9 is bonded to a plate 11. The plate 11 is seated in a socket 12 in a housing 13. The housing has side walls 14 which are grooved to allow movement of the core plate. The plate 10 has a close fit with the side wall 14 and the side wall is provided with an annular groove 15 and the plate 10 with an annular groove 16 which form a pocket adapted to receive a key in the form of a split locking ring 17. This locking ring, it will be noted, may be put in place by compressing the rubber elements 8 and 9 through pressure on the plate 10 sufficient to move the grooves 15 and 16 out of register so as to permit the insertion of the ring. The expansion of the rubber permanently and definitely locks the ring in the groove regardless of whether the ring is held in place through its resilience or not. The elements are preloaded to maintain pressure throughout under conditions of use.

A shank 18 has a tapered portion 19 which extends through an opening in the core plate and is secured to the core plate by a nut 20. The nut extends through an opening in the plate 10. The shank 18 extends through an opening 21 in the housing 13 and the walls of the opening are cushioned by a resilient ring 22 in the opening. Preferably the shank and opening are eccentric, as indicated in Fig. 7, and this eccentricity is sufficient to bring the shank into substantially a central position when the mounting is swung through the normal torque of the engine. This permits of a slightly smaller opening than would be necessary without this eccentricity.

The shank terminates in a sliding spherical joint ring 23 which operates over a spherical center 24. This spherical center is commonly formed of a composition and preferably a composition that is impregnated so as to give a degree of permanency to the lubrication. The sides of the spherical center are removed and the spherical center is split so as to permit the parts of the spherical center to be assembled in the joint ring 23. The spherical center has an opening 25 through which a projection 26 extends, the projection 26 extending from a pedestal 27. The end of the projection 26 is screw threaded. A nut 28 on the screw threaded portion clamps the center 24 on the projection. The nut has a flange slightly tapered, and similar spaces 30 and 31 are provided between the pedestal and the flange to permit the normal movement and form proper stops for limiting the abnormal movement.

This space is definitely limited to permit only the desired swinging under normal conditions of the sliding joint in one pitch or yaw direction, definitely limiting that movement.

It will be noted that the sides of the ring contact the limiting faces, the swinging movement through the yielding spherical surfaces being stopped, and when this takes place any movement through the rubber elements 8 and 9 is about the axis $x$—$x$ or focal point 4a and the reverse cupping of these rubber members while deadening the stopping movement, add to the resistance to a very large degree against any further relative movement in the direction locked by the engagement of the sides of the sliding joint ring. In this way it will also be noted rubber insulation between the engine and the supporting mounting ring is maintained through the rubber. This manner of stopping in a convenient and rugged manner permits the limiting of abnormal vibratory and transient movements that may occur in the operation of the engine.

The pedesetal has a securing plate 32 which is secured to the engine by cap screws 33 and is also provided with a projection 39 which is adapted to fit in a socket 39a in the engine, not shown, for definitely locating the pedestal.

In order that the link may swing independently of the rubber spherical joint in one direction, the housing 13 is pivotally connected with the ring. In the present construction this is accomplished as follows: Ears 34 are formed on the outer walls 14 of the housing. These ears are adapted to receive between them a ring 35 having spherical joint surfaces on its inner periphery, this ring receiving a center spherical member 36. This spherical member is split and is assembled in the manner indicated in Fig. 4. This is feasible because the distance from the point 37 to the point 38 is equal to the distance between the point 39 and the point 40 in the companion half of the spherical part, the point 40 being at right angles to the center of the first-named half. This permits the one half to be slid into place, then by turning the spherical part, they are locked in the spherical ring. In order to accomplish this the sides of the spherical ring are cut away sufficiently to permit this operation.

A bolt 41 extends through the ears and through an opening 36a in the spherical center 36, the head of the bolt 41 engaging one ear and a nut 43 the opposite ear to clamp the sliding joint center 36 between the ears. These spherical joints thus formed, one at each side of the housing 13, have shanks 44 extending from the sliding spherical joint rings. These shanks have a tapered extension 45 which extends through lugs 46 on brackets 47 secured to the ring. Nuts 48 are arranged on the ends of the shanks and draw the tapered extensions into the lugs.

It will be noted that any small variation in the lug centers with relation to the centers of the sliding spherical members on the housing may be accommodated by the turning of the shanks 44 in the lugs, which turning movement is accommodated by the spherical movement of the sliding joint, the locking of the parts through the clamping of the nut 48 being set up after any such small variation has been so accommodated.

It will be noted in this structure the double ball joints on the housings lock these housings against swinging or moving in a direction tangent to the axis $x$—$x$ or in other words, in response to torque impulses. Consequently all the links exert full resistance through the rubber elements, against swinging in a torque direction. On the other hand, it will be noted that the links have a zero resistance against a swinging movement toward and from the axis $x$—$x$, consequently half the links or half the resistance of the links are exerted in a pitch and yaw direction as compared with the resistance in a torque direction, this relation being varied slightly by the distance of the mountings from the axis $x$—$x$. Thus a soft pitch and yaw movement may be provided.

At the same time these movements are very definitely limited by reason of the space limitations 30 and 31 of the single ball joint at the inner end of the link, this spacing being nicely related to the desired limitation of such movements, and it will also be noted that the metallic stopping thus accomplished is exerted through the rubber cushioning against a side movement of the spherical elements.

The separation of the sliding joints on the housing prevents a localization of the entire strain on the mounting ring 1; and the spherical joints as shown, particularly if they are impregnated bearings, go over long periods without added lubrication and provide ample bearing surface to prevent wear.

The structure also simplifies the general arrangement and permits of a close coupling of the parts.

With these mountings a focal point is established in front of the plane of the mountings and preferably in front of the center of gravity, and this focal point forms a point of support. A second point of support is established in the general plane of the mountings and this establishes a virtual point of support intermediate the focal point and that in the general plane of the mountings. This virtual point of support is preferably established by the action of the mountings approximately at the center of gravity.

When a joint becomes locked due to excessive force on the mountings, an added restraining force or point of support is established to the rear of the supporting point in the general plane of the mountings, said rear point being established at the merger of lines normal to the lines from the mountings to the focal point. This restraining force at the rear point where the normal lines merge is added to that of the force at the point in the general plane of the mountings. This changes the point of virtual suspension to the rear, and this added resistance provides a very definite additional restraint to engine movement, particularly in the pitch and yaw directions.

Providing this added resistance under abnormal force makes it possible to give greater freedom or softness for the normal operation of the mountings. In the structure herein illustrated, the normal restraining force at the rear sustaining point is zero because there is no limitation in the normal running except the bare friction of the sliding joints in the pitch and yaw directions. Thus the maximum change in restraining force from normal to abnormal condition is achieved.

It will be noted that the curvature of the spherical faces may be varied. As it is made more nearly flat, the cocking action in creating the local swinging of the mounting increases. On the other hand when the joint is locked under abnormal conditions the flat surface more nearly corresponds with the tangent to that sphere of movement. As the curvature is increased, therefore, the swinging action becomes more nearly free from cocking compression and the resistance to movement after the locking of the ball joint becomes greater and as the curvature is flattened these conditions are reversed.

It will be noted that the line between the centers of the ball joints having the balls 36 passes slightly outside of the center of resistance of the rubber elements and the tendency to swing the housing in pitch or yaw directions by reason of this offset resistance in the rubber section is in a reverse direction from the rotational movement of the engine in pitch or yaw directions proper and this induces a greater binding action and consequently a greater resistance as the movement increases.

What I claim as new is:

1. A mounting comprising plates with opposing faces, yielding material such as rubber between the plates, the plates stressing the material in shear with a relative edgewise movement of the plates in any direction generally parallel with the faces thereof, attaching means connected by a joint to one of the plates and swinging with a substantially constant relation to a relatively fixed axis extending in the general direction of the plates, and an attaching means connected by a universal joint to the other of the plates and swinging on sliding surfaces.

2. A mounting comprising plates with opposing faces, yielding material such as rubber between the plates, the plates stressing the material in shear with a relative edgewise movement of the plates in any direction generally parallel with the faces thereof, attaching means connected by a joint to one of the plates and swinging with a substantially constant relation to a relatively fixed axis extending in the general direction of the plates, and an attaching means connected by a spherically slidingly surfaced joint having an inner ball member to the other of the plates and accommodating the joint movement on sliding surfaces, the sides of the ball member being out of spherical, and limiting stops operating on the sides to limit the joint movement on the ball member in one direction.

3. An airplane engine mounting comprising supporting links arranged around the torque axis and converging toward each other, said links including spaced members with opposing surfaces extending in the torque direction and yielding material such as rubber between the surfaces, the members stressing the material in shear with relative movement in the torque direction, attaching means connected by a joint to one of the members swinging in pitch and yaw with a substantially constant relation to a relatively fixed axis extending in the torque direction, and an attaching means connected by a universal joint to the other of the members and swinging on sliding surfaces.

4. An airplane engine mounting comprising supporting links arranged around the torque axis and converging toward each other, said links including spaced members with opposing surfaces extending in the torque direction and yielding material such as rubber between the surfaces, the members stressing the material in shear with relative movement in the torque direction, attaching means connected by a joint to one of the members swinging in pitch and yaw with a substantially constant relation to a relatively fixed axis extending in the torque direction, an attaching means connected to the other of the members by a spherical slidingly surfaced joint having an inner ball, and limiting stops operating on swinging in pitch and yaw to limit the joint movement on the ball member.

5. In a mounting assembly having a vibrating body and a mounting means attached thereto for supporting the body comprising three or more links converging from out of line positions toward a focal point, each link including two plates having opposing faces at substantially right angles to the longitudinal axis of the link, yielding material such as rubber between the plates, the plates stressing the material in shear with a relative movement of the plates in any direction generally parallel with the faces thereof, attaching means connected by a joint at one end of the link to one of the plates and swinging with a substantially constant relation to a relatively fixed axis extending in the general direction of the plates, and an attaching means connected by a universal joint to the other of the plates and accommodating the joint movement on sliding surfaces.

6. In a mounting assembly having a vibrating body and a mounting means attached thereto for supporting the body comprising three or more links converging from out of line positions toward a focal point, each link including two plates having opposing faces at substantially right angles to the longitudinal axis of the link, yielding material such as rubber between the plates, the plates stressing the material in shear with a relative movement of the plates in any direction generally parallel with the faces thereof, attaching means connected by a joint at one end of the link to one of the plates and swinging with a substantially constant relation to a relatively fixed axis extending in the general direction of the plates, the axes of the joints being at right angles to lines leading therefrom to the point of convergence of the links, and an attaching means connected by a universal joint to the other of the plates and accommodating the joint movement on sliding surfaces.

7. In a mounting assembly having a vibrating body and a mounting means attached thereto for supporting the body comprising three or more links converging from out of line positions toward a focal point, each link including two plates having opposing faces at substantially right angles to the longitudinal axis of the link, yielding material such as rubber between the plates, the plates stressing the material in shear with a relative movement of the plates in any direction generally parallel with the faces thereof, attaching means connected by a joint at one end of the link to one of the plates and swinging with a substantially constant relation to a relatively fixed axis extending in the general direction of the plates, the axes of the joints being tangent to a circle about an axis extending through the point of convergence, and an attaching means connected by a universal joint to the other of the plates and accommodating the joint movement on sliding surfaces.

8. In a mounting assembly a vibrating body having induced torsional vibrations and vibrations transverse to the axis of torsional vibrations, a mounting means attached thereto for supporting the body including a group of three or more out of line units, each unit comprising a link having plates with opposed faces with resilient material between the faces stressed in shear by an edgewise movement of the plates and yielding to permit a shear movement of the plates at right angles to the link in response to torsional vibrations and vibrations of the body transverse to the axis of the torsional vibrations, attaching means at one end of the link and connected with the link by an auxiliary joint swinging in substantially constant relation to a single axis in a direction corresponding to the general direction of one of the plates, and an attaching means connected by a universal joint to the other end of the link provided with sliding surfaces, the axes of the auxiliary joints of the different units being out of parallel, one unit reducing the resistance by swinging of the link in one direction and other units reducing resistance by swinging of the links in other directions.

9. In a mounting assembly a vibrating body having induced torsional vibrations and vibrations transverse thereto, a mounting means attached thereto for supporting the body including a group of three or more units grouped about the axis of the vibrating body, each unit having a link having plates with opposed faces with resilient material between the faces yielding to permit a shear movement of the plates crosswise of the direction of the links in response to torsional vibration and vibrations transverse to torsional vibrations of the body, the faces being substantially tangent to spheres having a focal point approximately at the axis of the vibrating body, an attaching means at one end of the link and connected with the link by an auxiliary joint swinging in a substantially constant relation to a single axis at right angles to the line extending to the focal point, and an attaching means connected by a universal joint to the opposite end of the link accommodating the movement by sliding surfaces, said auxiliary joints reducing the resistance of the unit in one swinging direction of the unit over the resistance of the unit in other directions.

10. In a mounting assembly a vibrating body having induced torsional vibrations and vibrations transverse to the axis of torsional vibrations, a mounting means attached thereto for supporting the body including a group of three or more out of line units, each unit comprising a link having plates with opposed faces with resilient material between the faces stressed in shear by an edgewise movement of the plates and yielding to permit a shear movement of the faces in a direction at right angles to the link in response to torsional vibrations and vibrations of the body transverse to the axis of the torsional vibrations, an attaching means at one end of the link and connected with the link by an auxiliary joint swinging in substantially constant relation to a single axis in a direction corresponding to the general direction of the plates and an attaching means connected by a universal joint to the other end of the link provided with sliding surfaces, the axes of the auxiliary joints of the different units being out of parallel, one unit reducing the resistance by swinging of the link in one direction and other units reducing resistance by swinging of the links in other directions, and means on the universal joint limiting its movement.

11. In a mounting assembly a vibrating body having induced torsional vibrations and vibrations transverse thereto, a mounting means attached thereto for supporting the body including a group of three or more units grouped about the axis of the vibrating body, each unit having a link having plates with opposed faces with resilient material between the faces yielding to permit a shear movement of the plates crosswise of the direction of the links in response to torsional vibration and vibrations transverse to torsional vibrations of the body, the faces of the plates being substantially tangent to spheres having a focal point approximately at the axis of the vibrating body, an attaching means at one end of each link and connected with the link by an auxiliary joint swinging in a substantially constant relation to a single axis at right angles to a line extending radially from the focal point to the unit, and a universal joint at the opposite end of the link accommodating the movement by sliding surfaces, said auxiliary joints reducing the resistance of the unit in one swinging direction of the unit over the resistance of the unit in other directions, and means on the universal joint limiting its movement.

12. In a mounting assembly a vibrating body having induced torsional vibrations and vibrations transverse to the axis of torsional vibrations, a mounting means attached thereto for supporting the body including a group of three or more out of line units, each unit comprising a link having plates with opposed faces with resilient material between the faces stressed in shear by an edgewise movement of the plates and yielding to permit a shear movement of the plates at right angles to the link in response to torsional vibrations and vibrations of the body transverse to the axis of the torsional vibrations, an attaching means at one end of the link and connected with the link by an auxiliary joint swinging in substantially constant relation to a single axis in a direction corresponding to the general direction of the plates, and an attaching means connected by a universal joint to the other end of the link provided with sliding surfaces, the axes of the auxiliary joints of the different units being out of parallel, one unit reducing the resistance by swinging of the link in one direction and other units reducing resistance by swinging of the links in other directions, and means on the universal joint limiting its movement in one direction.

13. In a mounting assembly a vibrating body having induced torsional vibrations and vibrations transverse thereto, a mounting means attached thereto for supporting the body including a group of three or more units grouped about the axis of the vibrating body, each unit having a link having plates with opposed faces with resilient material between the faces yielding to permit a shear movement of the plates crosswise of the direction of the links in response to torsional vibration and vibrations transverse to torsional vibrations of the body, the faces being substantially tangent to spheres having a focal point approximately at the axis of the vibrating body, an attaching means at one end of each link and connected with the link by an auxiliary joint swinging in a substantially constant relation to a single axis at right angles to a line extending radially from the focal point to the unit, and an attaching means connected by a universal joint to the opposite end of the link accommodating the movement by sliding surfaces, said auxiliary joints reducing the resistance of the unit in one swinging direction of the unit over the resistance of the unit in other directions, and means on the universal joint limiting its movement in one direction.

14. A mounting assembly, a vibrating body having induced torsional vibrations and vibrations transverse thereto, a mounting means attached thereto for suporting the body including a group of three or more units grouped about the axis of the vibrating body, each unit having a link including plates having opposing faces with the resilient material between the faces yielding to permit a shear movement of the plates in response to torsional vibrations and vibrations transverse to torsional vibrations of the body, the faces of the plates being substantially tangent to spheres having a focal point approximately in the axis of the vibrating body, an attaching means at one of the ends of the link and connected with the link by an auxiliary joint swinging on a substantially constant axis at right angles to the line leading from the unit to the focal point and tangent to a circle about the axis of the body, and an attaching means connected by a universal joint to the opposite end of the link.

15. A mounting assembly, a vibrating body having induced torsional vibrations and vibrations transverse thereto, a mounting means attached thereto for supporting the body including a group of three or more units grouped about the axis of the vibrating body, each unit having a link including plates having opposing faces with resilient material between the faces yielding to permit a shear movement of the plates in response to torsional vibrations and vibrations transverse to torsional vibrations of the body, the faces of the plates being substantially tangent to spheres having a focal point approximately in the axis of the vibrating body, an attaching means at one of the ends of the link and connected with the link by an auxiliary joint swinging on a substantially constant axis at right angles to the line leading from the unit to the focal point and tangent to a circle about the axis of the body, and an attaching means connected by a universal joint to the opposite end of the link, and means limiting the swinging about the universal joint in pitch and yaw directions.

16. In a mounting comprising plates with opposing faces, yielding means such as rubber between the plates, the plates stressing the means in shear with a relative edgewise movement of the plates in any direction generally parallel with the faces thereof, attaching means connected by spherically slidingly surfaced joints spaced apart and having their axes in the general direction of the plate faces to one of the plates, and an attaching means connected by a spherically slidingly surfaced joint to the other of said plates.

17. In a mounting comprising plates with opposing faces, yielding means such as rubber between the plates, the plates stressing the means in shear with a relative edgewise movement of the plates in any direction generally parallel with the faces thereof, attaching means connected by spherically slidingly surfaced joints spaced apart and having their axes in the general direction of the plate faces to one of the plates, and an attaching means connected by a spherically slidingly surfaced joint to the other of said plates, projections from said joints being off center to permit a relative movement to accommodate tolerances.

18. In a mounting comprising plates with opposing faces, yielding means such as rubber between the plates, the plates stressing the means in shear with a relative edgewise movement of the plates in any direction generally parallel with the faces thereof, attaching means connected by spherically slidingly surfaced joints spaced apart and having their axes in the general direction of the plate faces to one of the plates, and an attaching means connected by a spherically slidingly surfaced joint to the other of said plates, and means limiting the movement of the last mentioned joint in one direction.

19. In a mounting assembly a vibratory body having rotative elements, a plurality of units attached to the body for supporting the same, each unit having a link including an intermediate resilient element and extending from the unit toward a focal point adjacent the axis of the rotative elements, an attaching means connected by a universal joint to one end of each link, said joint having sliding surfaces, an attaching means connected by an auxiliary joint to the opposite end of the link swinging in substantially constant relation to a single axis, the axes of the auxiliary joints being directioned relatively to the axis of the rotative elements varying the resistance of the resilient elements of the combined assembly to movements of the body about and crosswise of the axis of the rotative elements.

20. In a mounting assembly a vibrating body having induced torsional vibrations and vibrations transverse to the torsional vibrations, a mounting means attached thereto for supporting the body including a group of three of more out of line units, each unit comprising a link having plates with opposed faces with resilient material between the faces stressed in shear by an edgewise movement of the plates and yielding to permit a shear movement of the plates at right angles to the link in response to torsional vibrations and vibrations of the body transverse to the axis of the torsional vibrations, an attaching means at one end of the link and connected with the link by an auxiliary joint swinging in substantially constant relation to a single axis in a direction corresponding to the general direction of the plates, an attaching means connected by a universal joint to the other end of the link, the relative fixed axes of the auxiliary joints of the different units being out of parallel, one unit reducing the resistance by swinging in one direction and the other units reducing resistance in other directions, and means limiting the swinging of each unit in one direction.

21. In a mounting assembly a vibrating body having induced torsional vibrations and vibrations transverse to the torsional vibrations, a mounting means attached thereto for supporting the body including a group of three or more out of line units, each unit comprising a link having plates with opposed faces with resilient material between the faces stressed in shear by an edgewise movement of the plates and yielding to permit a shear movement of the plates at right angles to the link in response to torsional vibrations and vibrations of the body transverse to the axis of the torsional vibrations, an attaching means at one end of the link and connected with the link by an auxiliary joint swinging in substantially constant relation to a single axis in a direction corresponding to the general direction of the plates, an attaching means connected by a universal joint to the other end of the link, the relative fixed axes of the auxiliary joints of the different units being out of parallel, one unit reducing the resistance by swinging in one direction and other units reducing resistance in other directions, and means for limiting the swinging movement in only pitch and yaw directions.

22. In a mounting assembly a vibrating body having induced torsional vibrations and vibrations transverse to the torsional vibrations, a mounting means attached thereto for supporting the body including a group of three or more out of line units, each unit comprising a link having plates with opposed faces with resilient material between the faces stressed in shear by an edgewise movement of the plates and yielding to permit a shear movement of the plates at right angles to the link in response to torsional vibrations and vibrations of the body transverse to the axis of the torsional vibrations, an attaching means at one end of the link and connected with the link by an auxiliary joint swinging in substantially constant relation to a single axis in a direction corresponding to the general direction of the plates, an attaching means connected by a universal joint to the other end of the link, the relative fixed axes of the auxiliary joints of the different units being out of parallel, one unit reducing the resistance by swinging in one direction and other units reducing resistance in other directions, means for limiting the swinging movement in only pitch and yaw directions, and a separate means limiting the torsional movement.

23. In a mounting assembly a vibrating body having induced torsional vibrations and vibrations transverse to the torsional vibrations, a mounting means attached thereto for supporting the body including a group of three or more out of line units, each unit comprising a link having plates with opposed faces with resilient material between the faces stressed in shear by an edgewise movement of the plates and yielding to permit a shear movement of the plates at right angles to the link in response to torsional vibrations and vibrations of the body transverse to the axis of the torsional vibrations, an attaching means at one end of the link and connected with the link by an auxiliary joint swinging in substantially constant relation to a single axis in a direction corresponding to the general direction of the plates, an attaching means connected by a universal joint to the other end of the link, the relative fixed axes of the auxiliary joints of the different units being out of parallel, one unit reducing the resistance by swinging in one direction and other units reducing resistance in other directions, and means limiting the swinging of the universal joint in only pitch and yaw directions.

24. In a mounting assembly a vibrating body having induced torsional vibrations and vibrations transverse to the torsional vibrations, a mounting means attached thereto for supporting the body including a group of three or more out of line units, each unit comprising a link having plates with opposed faces with resilient material between the faces stressed in shear by an edgewise movement of the plates and yielding to permit a shear movement of the plates at right angles to the link in response to torsional vibrations and vibrations of the body transverse to the axis of the torsional vibrations, an attaching means at one end of the link and connected with the link by an auxiliary joint swinging in substantially constant relation to a single axis in a direction corresponding to the general direction of the plates, an attaching means connected by a universal joint to the other end of the link, the relative fixed axes of the auxiliary joints of the different units being out of parallel, one unit reducing the resistance by swinging in one direction and other units reducing resistance in other direction, means limiting the swinging of the universal joint in only pitch and yaw directions, and a separate means limiting the torsional movement.

25. In a mounting, a housing, an intermediate plate therein, rubber elements on both sides of the intermediate plate, opposing outer plates at the outer sides of said elements, said opposing outer plates having means securing the plates within the housing comprising portions of the housing and of one of the outer plates extending into opposing overlapping relation with overlapping opposing grooves therein forming a key-receiving pocket, a key in the pocket, the resilience of the rubber permitting a movement of the outer plate within the housing for opening the pocket to permit the insertion of the key, the resilience of the elements forcing a return movement of said outer plate to effect a normal closure of the pocket to positively retain the key therein.

26. A mounting system for a body subjected to rotative vibratory action comprising a support, a plurality of mountings connecting the body to the support and having elements that yield to rotating and angular vibrations about the axis of the body, said mountings being positioned at intervals around the axis of the body and being formed to provide axially spaced points of restraint along the axis of the body, a first point of restraint being approximately at the plane of the mountings and a second point of restraint being offset axially in the general direction of the center of gravity of the body, said points of restraint locating a resulting virtual point of restraint intermediate the spaced points of restraint, and means for modifying the action of the yieldable mountings under stress, said means being effective to change the resistance at a third point of restraint and to add sustaining restraint and to move the point of virtual restraint of the body toward the plane of the mountings and to increase the resistance to movement of the body.

27. A mounting system for a body subjected to rotative vibratory action comprising a support, a plurality of mountings connecting the body to the support and having elements that yield to rotating and angular vibrations about the axis of the body, said mountings being positioned at intervals around the axis of the body and being formed to provide axially spaced points of restraint along the axis of the body, a first point of restraint being approximately at the plane of the mountings and a second point of restraint being offset axially in the general direction of the center of gravity of the body, said points of restraint locating a resulting virtual point of restraint intermediate the spaced points of restraint, and said mountings including means for modifying the action of the yieldable mountings under stress, said modifying means being effective to change the resistance at a third point of restraint and to add sustaining restraint and to move the point of virtual restraint of the body toward the plane of the mountings and to increase the resistance to movement of the body.

28. In a mounting system, the combination of a body subjected to rotative vibratory action, adapted for overhung suspension on an upright support in a plane crosswise of the axis of the body, a suspension attached to the body for supporting the body in overhung relation to such a support comprising yieldable mountings for the body yielding to rotating and angular vibrations about the axis of the body, said mountings providing axially spaced points of restraint along the axis of the body, a first point of restraint being approximately at the plane of the mountings and the second point of restraint being offset axially in the general direction of the center of gravity of the body, said points of restraint locating the virtual point of restraint intermediate the spaced points of restraint, and stops borne by the mounting for modifying the action thereof when under stress, said stops being effective to change the resistance at a third point of restraint and to add sustaining restraint and to move the point of virtual restraint of the body toward the plane of the mountings and to increase the resistance to movement of the body.

RICHARD C. HENSHAW.